(12) United States Patent
Tatsuda

(10) Patent No.: US 10,735,604 B2
(45) Date of Patent: Aug. 4, 2020

(54) IMAGE QUALITY INSPECTION CAMERA SYSTEM, PRINTING APPARATUS, AND LIGHT SOURCE ADJUSTMENT METHOD

(71) Applicant: SEIKO EPSON CORPORATION, Tokyo (JP)

(72) Inventor: Tetsuo Tatsuda, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/275,055

(22) Filed: Feb. 13, 2019

(65) Prior Publication Data

US 2019/0253568 A1    Aug. 15, 2019

(30) Foreign Application Priority Data

Feb. 14, 2018  (JP) ................................ 2018-024222

(51) Int. Cl.
*G06T 7/00* (2017.01)
*H04N 1/00* (2006.01)

(52) U.S. Cl.
CPC ....... *H04N 1/00251* (2013.01); *G06T 7/0004* (2013.01); *H04N 1/00005* (2013.01); *G06T 2207/10152* (2013.01); *G06T 2207/30144* (2013.01); *G06T 2207/30168* (2013.01)

(58) Field of Classification Search
CPC ........... H04N 1/00251; H04N 1/00005; H04N 9/3155; G06T 7/0004; G06T 2207/10152; G06T 2207/30168

USPC ......... 358/1.9, 3.27, 504, 509; 399/4, 11, 15
See application file for complete search history.

(56) References Cited

U.S. PATENT DOCUMENTS

2013/0027721 A1* 1/2013 Kobayashi ........... H04N 1/6033
358/1.9

FOREIGN PATENT DOCUMENTS

JP          2012-237780 A     12/2012

* cited by examiner

*Primary Examiner* — Jamares Q Washington
(74) *Attorney, Agent, or Firm* — Foley & Lardner LLP

(57) ABSTRACT

An image quality inspection camera system includes: N (integer of N≥2) light sources that emit light on a medium; a camera for photographing the medium; and a control section, in which the control section executes setting processing when an i-th light source (integer of i=1 to N) is lit with a reference driving signal, for setting an image quality inspection time driving signal of the i-th light source, and the setting processing includes calculating an i-th representative luminance value by performing a predetermined representative luminance value calculation processing based on a luminance value of each pixel photographed by the camera when the i-th light source is lit with the reference driving signal, and determining the image quality inspection time driving signal of the i-th light source by adjusting the reference driving signal such that the i-th representative luminance value satisfies a predetermined target luminance value condition.

19 Claims, 13 Drawing Sheets

IMAGE QUALITY INSPECTION CAMERA SYSTEM, PRINTING APPARATUS, AND LIGHT SOURCE ADJUSTMENT METHOD

BACKGROUND

1. Technical Field

The present invention relates to an image quality inspection camera system or the like including a light source and a camera for image quality inspection.

2. Related Art

In a printing apparatus, when printing of a printed matter, such as a signage or the like, which is particularly required to have a high image quality, it is known that image quality inspection and so called "calibration" which is adjustment processing of printing control are performed before printing. A result of the calibration largely influences the printing quality, and thus there is a demand for a calibration method capable of improving a printing result to be developed.

For example, JP-A-2012-237780 discloses a method in which a light quantity of a line sensor is adjusted such that, in a process of performing calibration using a test pattern such as a patch image or the like, a region including noise data other than a test pattern region is not read.

Paper, cloth, a plastic sheet, or the like is used as a printing medium, and is selected in accordance with an application. A surface of the printing medium is not limited to being smooth, may have an uneven shape which is called a texture specific to the medium. Even if the same color images are reproduced, in a case where the textures are different, printed matters obtained by printing also have different appearances. Therefore, although an initial setting of printing control in accordance with the texture is to be performed by the calibration, since the texture is in an unknown state when the calibration is executed, it is necessary to achieve favorable calibration regardless of the texture.

For example, in a case where one light source for the calibration is used, since a direction of light with which the texture is irradiated is limited, shades in accordance with the fine unevenness of the texture appear, and thus the result of the calibration is influenced in some cases. Accordingly, a method in which, by providing a plurality of light sources, direction dependence of the light with which the texture is irradiated is reduced and stabilized calibration can be achieved is considered. However, in JP-A-2012-237780, a plurality of light sources is not assumed, and a light quantity adjustment of the light source for achieving favorable calibration and a noise reduction in a case of using the plurality of light sources are not disclosed. In other words, a light source adjustment for performing calibration, which can also be said to be calibration for performing the calibration, is required, but is not disclosed in JP-A-2012-237780.

SUMMARY

An advantage of some aspects of the invention is to provide a new technique that achieves favorable calibration using a plurality of light sources and a camera.

According to a first aspect of the invention, an image quality inspection camera system includes: N (N≥2) light sources that emit light on a medium on which printing is performed; a camera for photographing the medium; and a control section, in which the control section executes setting processing, based on photographed data photographed by the camera when an i-th light source (i=1 to N) is lit with a reference driving signal, for setting an image quality inspection time driving signal of the i-th light source, and the setting processing includes calculating an i-th representative luminance value by performing a predetermined representative luminance value calculation processing based on a luminance value of each pixel photographed by the camera when the i-th light source is lit with the reference driving signal, and determining the image quality inspection time driving signal of the i-th light source by adjusting the reference driving signal such that the i-th representative luminance value satisfies a predetermined target luminance value condition.

According to the first aspect of the invention, based on the photographed data in a case that lighting is performed for each light source, the image quality inspection time driving signal can be set for each light source. Additionally, each light source can be adjusted such that the representative luminance value of the image photographed when each light source is individually lit satisfies the common target luminance value condition. Accordingly, it is possible to suppress nonuniformity which may occur in the image photographed for calibration due to a light quantity difference among the respective light sources, and to achieve favorable calibration.

According to a second aspect of the invention, an image quality inspection camera system includes: N (N≥2) light sources that emit light on a medium on which printing is performed; a camera for photographing the medium; and a control section, in which the control section executes setting processing, based on photographed data photographed by the camera when an i-th light source (i=1 to N) is lit with a reference driving signal, for setting an image quality inspection time driving signal of the i-th light source, and the setting processing includes calculating an i-th representative luminance value by performing a predetermined representative luminance value calculation processing based on a luminance value of each pixel photographed by the camera when the i-th light source is lit with the reference driving signal, temporarily determining a temporary driving signal of the i-th light source by adjusting the reference driving signal such that the i-th representative luminance value satisfies a predetermined target luminance value condition, and determining, based on the luminance value of each pixel photographed by the camera when N light sources are lit by lighting the i-th light source with the temporary driving signal which corresponds to the i-th light source, the image quality inspection time driving signal of the i-th light source by adjusting the temporary driving signal of each light source.

According to the second aspect of the invention, based on the photographed data in a case that lighting is performed for each light source, the image quality inspection time driving signal can be set for each light source. Additionally, after adjusting each light source such that the representative luminance value of the image photographed when each light source is individually lit satisfies the common target luminance value condition, the light sources are further simultaneously lit and readjustment is performed, and thus accuracy of a light quantity adjustment can be enhanced. Accordingly, it is possible to suppress nonuniformity which may occur in the image photographed for calibration due to a light quantity difference among the respective light sources, and to achieve favorable calibration.

According to a third aspect of the invention, in the image quality inspection camera system according to the first or second aspect of the invention, it is preferable that the representative luminance value calculation processing include calculating integrated photographed data by integrating luminance values of respective M (integer of M≥2) pixels photographed by the camera when the i-th light source is lit with the reference driving signal, and calculating the i-th representative luminance value based on the integrated photographed data.

According to the third aspect of the invention, even if some of many pixels provided on an image sensor of the camera have failure, it is possible to reduce the influence thereof and achieve a stabilized light quantity adjustment with a good quality.

According to a fourth aspect of the invention, in the image quality inspection camera system according to the first or second aspect of the invention, it is preferable that the image quality inspection camera system be provided in a carriage section of a printing apparatus, and the representative luminance value calculation processing include calculating, during movement of the carriage section in a main scanning direction, for photographed data of a plurality of times photographed by the camera when the i-th light source is lit with the reference driving signal, averaged photographed data by averaging luminance values of corresponding pixels, and calculating the i-th representative luminance value based on the averaged photographed data.

Additionally, according to a fifth aspect of the invention, in the image quality inspection camera system according to the first or second aspect of the invention, it is preferable that the image quality inspection camera system be provided in a carriage section of a printing apparatus, and the representative luminance value calculation processing include calculating, during movement of the carriage section in a main scanning direction, for photographed data of a plurality of times photographed by the camera when the i-th light source is lit with the reference driving signal, photographed data by averaging luminance values of corresponding pixels and integrating luminance values of respective M (M≥2) pixels, and calculating the i-th representative luminance value based on the photographed data on which the averaging and the integrating are performed.

According to the fourth or fifth aspect of the invention, by photographing a plurality of times along a printing direction, obtaining sample photographed data for each photographing, and averaging them, photographed data to be a base of the adjustment can be obtained. Accordingly, a favorable light quantity adjustment in which influence of fine unevenness included in a texture of a medium on which printing is performed is reduced can be achieved.

According to a sixth aspect of the invention, in the image quality inspection camera system according to any one of the first to fifth aspects of the invention, it is preferable that calculating the i-th representative luminance value be calculating a predetermined high frequency luminance value to be a higher luminance than a center value and a lower luminance than a highest luminance value of a histogram of luminance values of the respective pixels included in the photographed data as a representative luminance value.

According to the sixth aspect of the invention, while securing brightness necessary for photographing, the light quantity adjustment in which blown out is appropriately suppressed can be achieved.

According to a seventh aspect of the invention, in the image quality inspection camera system according to any one of the first to sixth aspects of the invention, it is preferable that the control section perform the light quantity setting processing for the medium in a state before printing for image quality inspection.

According to the seventh aspect of the invention, the light quantity can be appropriately set before printing for the image quality inspection.

According to an eighth aspect of the invention, in the image quality inspection camera system according to any one of the first to seventh aspects of the invention, it is preferable that the N light sources include at least two light sources, the two light sources be installed at positions where light emission front directions are directions of a regular reflection to each other with respect to the medium, and the camera be installed such that an optical axis of the camera faces a reflection position of the regular reflection.

According to the eighth aspect of the invention, a direct reflection of the light source can be suppressed from entering the camera and shades can be made hard to occur when viewed from the camera, and thus the appropriate light quantity adjustment can be achieved.

According to a ninth aspect of the invention, in the image quality inspection camera system according to any one of the first to eighth aspects of the invention, it is preferable that the control section perform the image quality inspection processing while lighting all the N light sources, by driving the i-th light source with the image quality inspection time driving signal set through the setting processing.

According to the ninth aspect of the invention, the image quality inspection processing is executed while lighting all the light sources based on a result of the light quantity adjustment for each of the light sources, and thus, while securing the light quantity sufficient for the inspection, direction dependence of the light can be reduced and the favorable calibration can be achieved.

According to a tenth aspect of the invention, a printing apparatus includes the image quality inspection camera system according to any one of the first to ninth aspects of the invention.

According to the tenth aspect of the invention, the printing apparatus which provides the same effect as that of any one of the first to ninth aspects of the invention can be provided.

According to an eleventh aspect of the invention, a light source adjustment method in an image quality inspection camera system installed in a printing apparatus, the image quality inspection camera system including N (integer of N≥2) light sources that emit light on a medium on which printing is performed, and a camera for photographing the medium, the light source adjustment method includes: lighting an i-th light source (i=1 to N) with a reference driving signal; setting, based on photographed data photographed by the camera when the i-th light source is lit, an image quality inspection time driving signal of the i-th light source; calculating an i-th representative luminance value by performing a predetermined representative luminance value calculation processing based on a luminance value of each pixel photographed by the camera when the i-th light source is lit with the reference driving signal; and determining the image quality inspection time driving signal of the i-th light source by adjusting the reference driving signal such that the i-th representative luminance value satisfies a predetermined target luminance value condition.

According to the eleventh aspect of the invention, the light source adjustment method which provides the same effect as that of the first aspect of the invention can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
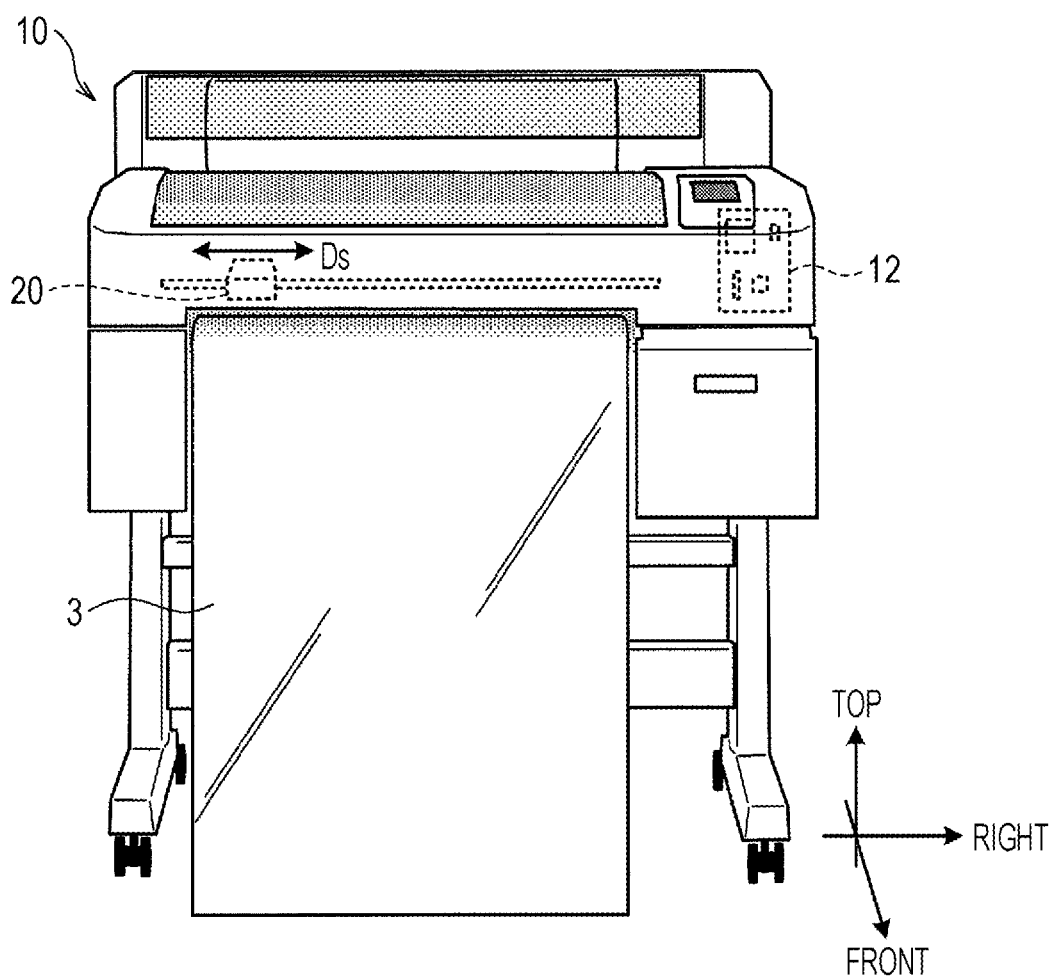
FIG. 1 is a front view illustrating a configuration example of a printing apparatus.

Hereinafter, a preferred embodiment of the invention will be described with reference to the drawings. Note that the invention is not limited to the embodiment described below, and a form to which the invention can be applied is not limited to the embodiment described below. Furthermore, in the drawings, the same reference numerals are appended to identical elements.

FIG. 1 is a front view illustrating a configuration example of a printing apparatus 10 according to the embodiment. The printing apparatus 10 is an ink jet type color printer which forms a color image by discharging liquid droplets of printing ink such as dye or pigment onto a medium 3 on which printing is performed having a sheet shape made of a material such as paper, cloth, plastic, or the like.

To be specific, the printing apparatus 10 is equipped with a printing machine control board 12 and a carriage section 20.

The printing machine control board 12 is a control substrate for integrally controlling an operation of the printing machine.

The printing apparatus 10 performs printing by ejecting the printing ink onto the medium 3 while moving the carriage section 20 along a predetermined main scanning direction Ds by control of the printing machine control board 12.

Note that the printing apparatus 10 according to the embodiment is assumed to be an LFP (Large Format Printer) capable of handling a medium equal to or larger than an A2 size as the medium 3 on which printing is performed, but may be a medium or small ink jet type printing apparatus.

Figure 2:
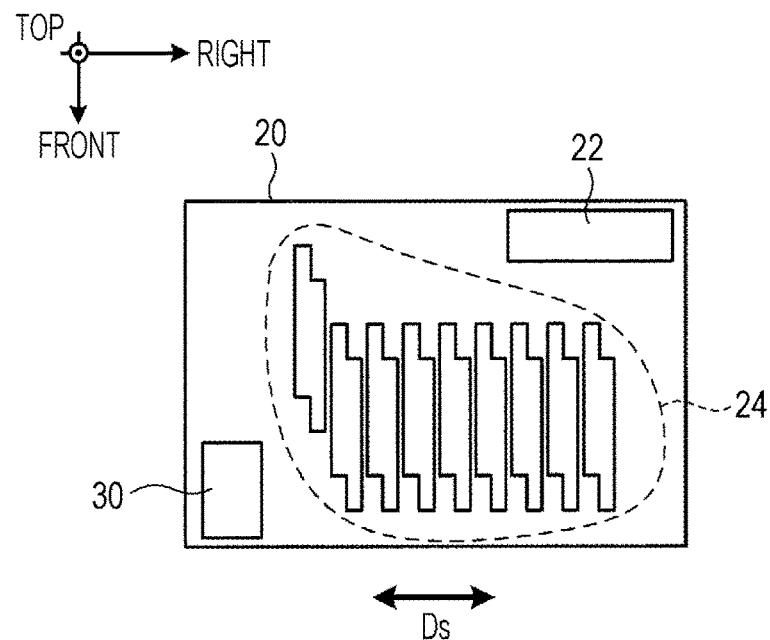
FIG. 2 is a schematic arrangement diagram for explaining an overview of a configuration example of a carriage.

FIG. 2 is a schematic arrangement diagram for explaining an overview of a configuration example of the carriage section 20 according to the embodiment, and corresponds to a top view of the carriage section 20.

The carriage section 20 is equipped with a carriage section controller 22, a printing head unit group 24, and an image quality inspection camera system 30.

The carriage section controller 22 receives a control signal from the printing machine control board 12 and integrally controls an operation of the carriage. The carriage section controller corresponds to a control substrate of the carriage section.

The printing head unit group 24 is an ink jet type printer head. In accordance with the number of colors and a type of the printing ink to be used, the number and relative positions of the printing heads to be provided can be appropriately set.

The image quality inspection camera system 30 is a photographing unit for performing so-called "calibration" in which printing control of the printing head unit group 24 is optimized for the medium 3 which is set in the printing apparatus 10.

Figure 3:
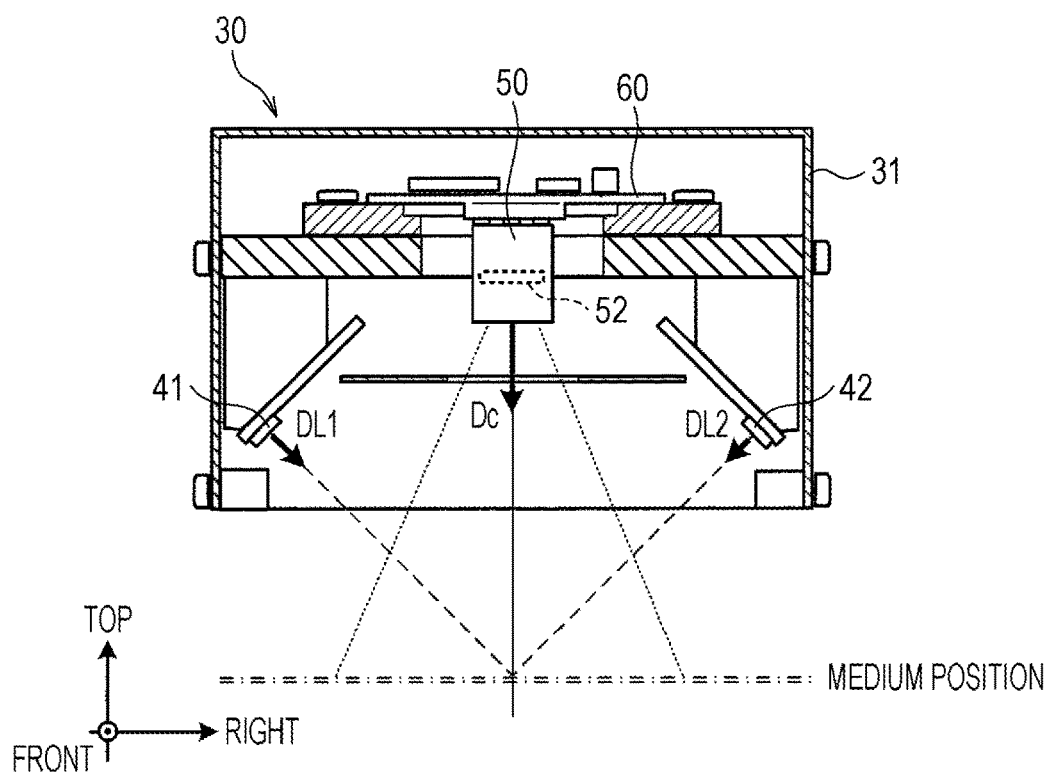
FIG. 3 is a diagram illustrating a configuration example of an image quality inspection camera system.

FIG. 3 is a diagram illustrating a configuration example of the image quality inspection camera system 30 according to the embodiment, and a vertical cross-sectional view illustrating an internal structure of the system.

The image quality inspection camera system 30 is equipped with a first light source 41 and a second light source 42, a camera 50, and a system control board 60 in a box shaped case 31 having an opening portion at a lower portion. As a matter of course, elements other than these elements can also be appropriately included.

The first light source 41 and the second light source 42 are N (N≥2) light sources for emitting light for photographing to the medium 3 on which printing is performed, and installed at positions where light emission front directions DL1 and DL2 of the respective light sources are directions of a regular reflection to each other with respect to the medium 3 on which printing is performed. Additionally, the first light source 41 and the second light source 42 are white light emitting diodes in the embodiment, and light quantities are each controlled by a voltage and a current for driving being controlled by the system control board 60.

Note that a light emitting body of each of the first light source 41 and the second light source 42 is not limited to the white light emitting diode. A light emitting diode of another color may be used, and a type of the light emitting body can also be appropriately set. Additionally, although the embodiment describes the number N of the light sources as two, as long as there is a plurality of light sources, three or more light sources may be used.

The camera 50 is installed such that an optical axis Dc faces a reflection position of the regular reflection of the first light source 41 and the second light source 42. The camera 50 is equipped with a lens unit including an optical element such as a lens or the like and an image sensor 52, and connected to the system control board 60. Although the embodiment describes the image sensor 52 as a black and white image sensor, a color image sensor may be used. Additionally, although the number of pixels of the image sensor 52 is assumed to be approximately two million pixels, the number of pixels and a pitch can be appropriately set.

Figure 4:
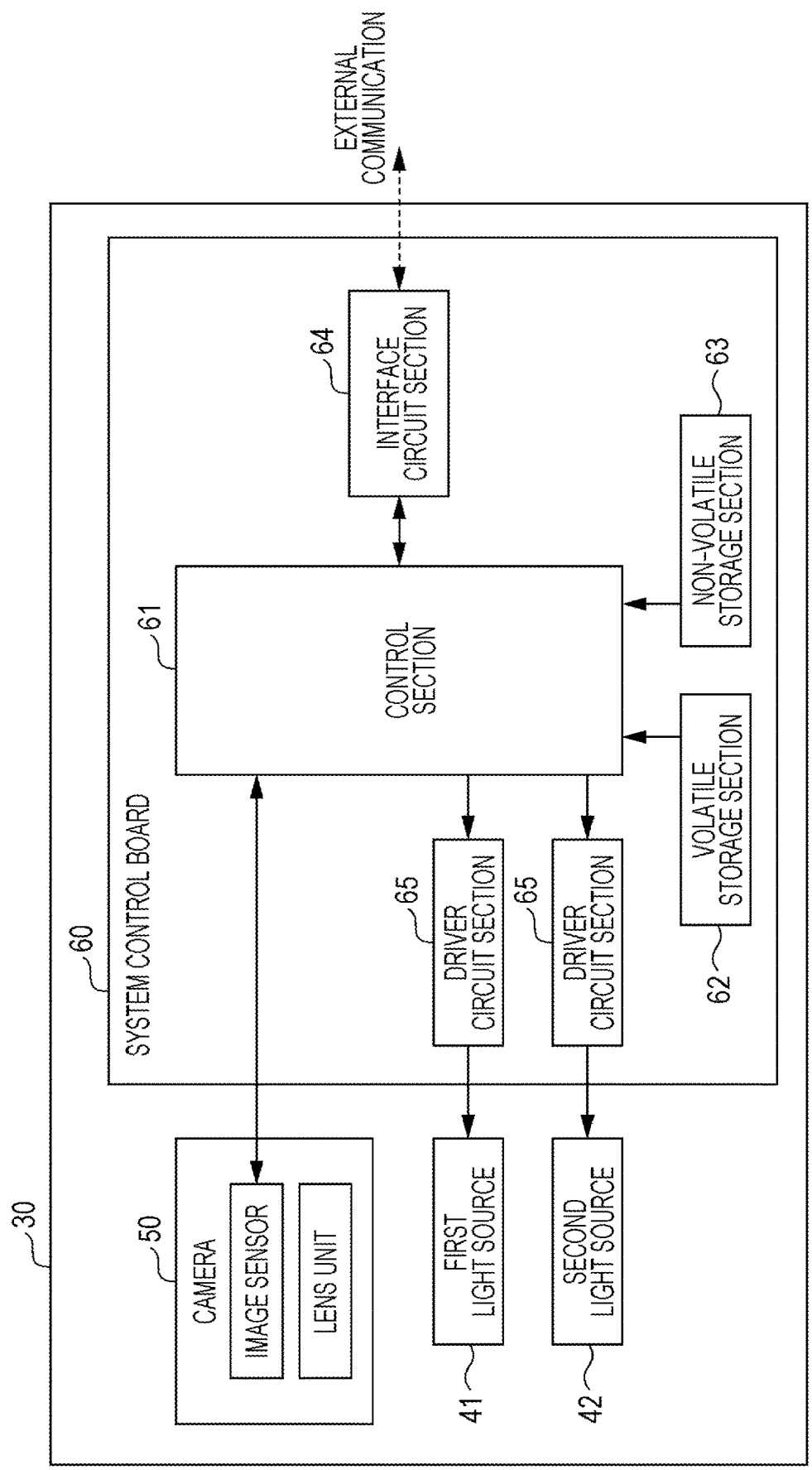
FIG. 4 is a block diagram of the image quality inspection camera system.

FIG. 4 is a block diagram of the image quality inspection camera system 30. The system control board 60 is equipped with a control section 61, a volatile storage section 62, a non-volatile storage section 63, an interface circuit section 64, and a driver circuit section 65. Other constituent elements relating to a power source, communication, and the like are appropriately provided.

The control section 61 executes various types of arithmetic processing for integrally controlling the image quality inspection camera system. In the embodiment, the control section is achieved by an FPGA (Field Programmable Gate Array), but may be achieved by causing a so-called CPU (Central Processing Unit) to execute a program stored in the non-volatile storage section 63.

The volatile storage section 62 is used as an arithmetic region of the control section 61. Although, in the embodiment, the volatile storage section is configured by an SDRAM (Synchronous Dynamic Random Access Memory), a type and the number of RAMs (Random Access Memories) can be appropriately selected.

The non-volatile storage section 63 stores a program and data required for the arithmetic processing of the control section 61 in a non-volatile manner. In the embodiment, the non-volatile storage section is configured by a ROM (Read Only Memory). The non-volatile storage section can also be configured by an EPROM (Erasable Programmable Read Only Memory), an EEPROM (Electrically Erasable Programmable Read Only Memory), a flash memory, or the like, which is a ROM capable of erasing held data.

The interface circuit section 64 is a circuit section which provides an interface through which the control section 61 performs input/output of a signal from/to an external device. The interface circuit section can be operated using a so-called interface IC, a communication terminal, or the like. In the embodiment, data communication with the carriage section controller 22, or with the printing machine control board 12 is made possible.

The driver circuit sections 65 are driving circuits for supplying electric power for driving the first light source 41 and the second light source 42, respectively, and are prepared for the first light source 41 and the second light source 42, respectively. The driver circuit section 65 outputs a DC voltage and a DC current to be a driving signal to a corresponding light source on the basis of a driving control signal output from the control section 61. The DC voltage and DC current to be the driving signal can be controlled by the control section 61.

Additionally, in the embodiment, in order to achieve favorable calibration using the plurality of light sources and the camera, the control section 61 executes setting processing for setting an image quality inspection time driving signal of each of the light sources.

Figure 5:
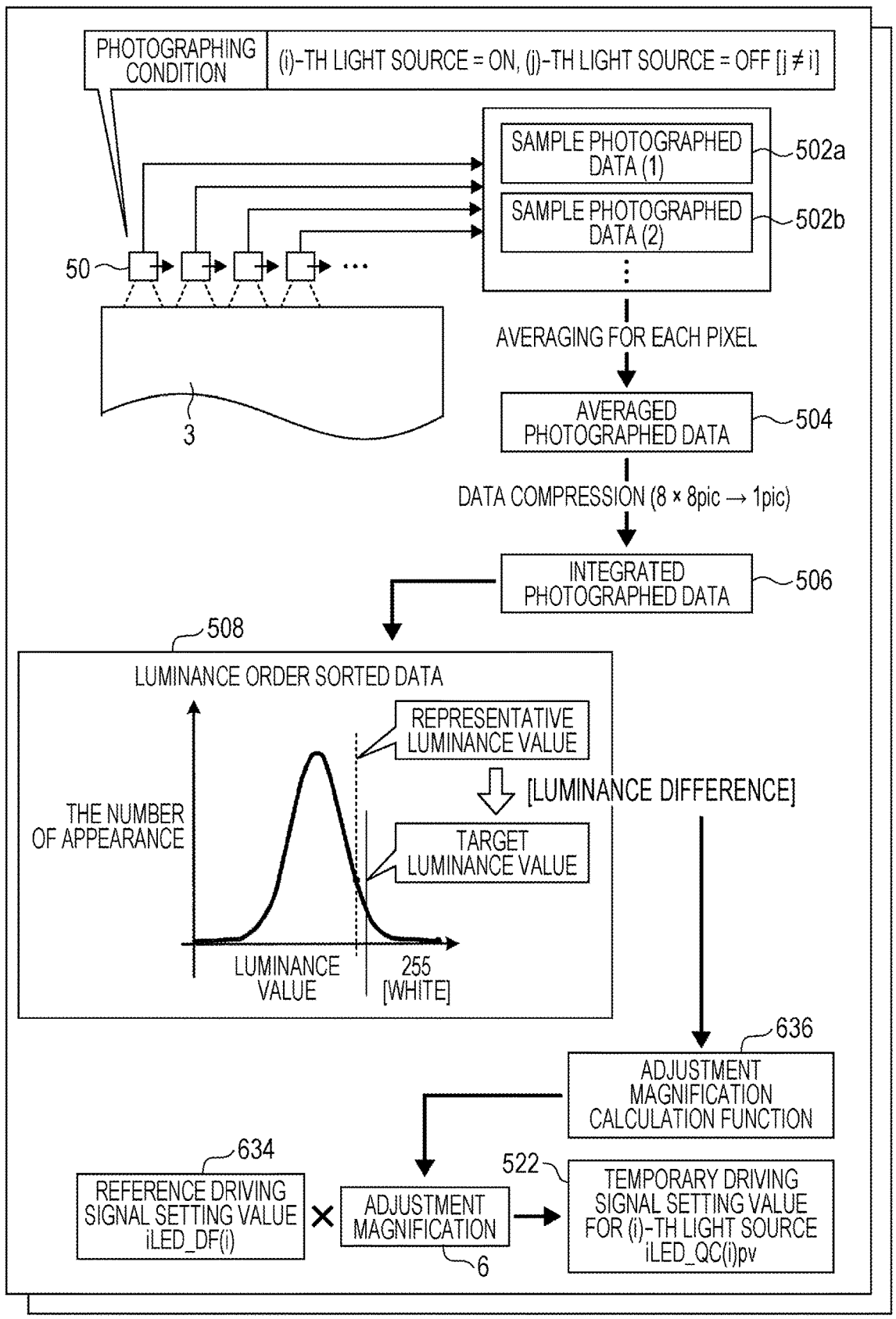
FIG. 5 is a diagram for explaining contents and a flow of setting processing.
Figure 6:
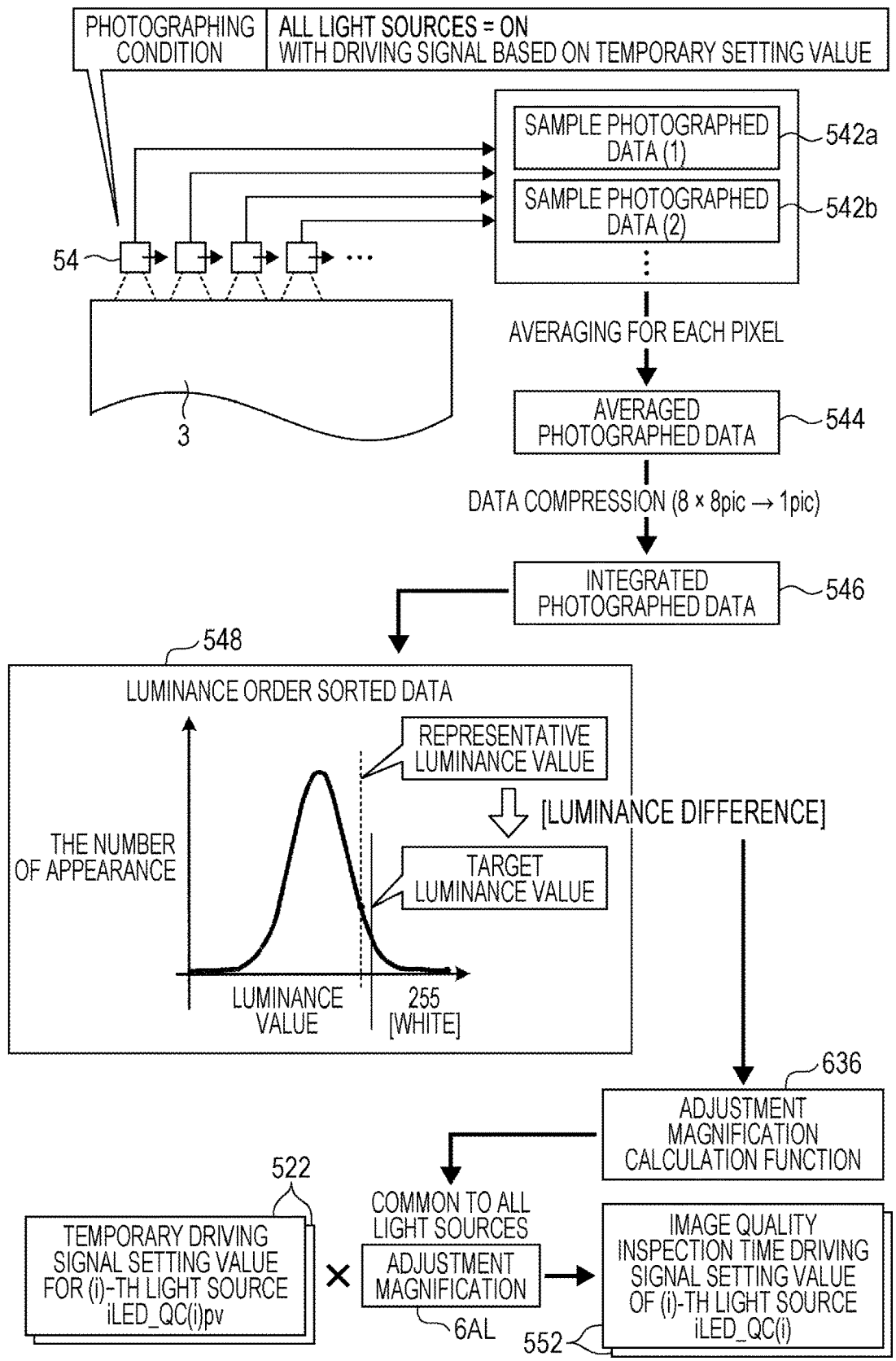
FIG. 6 is a diagram for explaining contents and a flow of the setting processing.

FIG. 5 and FIG. 6 are diagrams for explaining contents and a flow of the setting processing.

As illustrated in FIG. 5, first, as the setting processing, the control section 61 prepares photographed data to be a source of the setting for each of the light sources, and determines a temporary setting value of the image quality inspection time driving signal therefrom.

To be specific, on a photographing condition that only an i-th (i=natural number) light source to be a target is lit with a predetermined reference driving signal, the medium 3 on which printing is performed is photographed by the camera 50. In the embodiment, since two light sources are included, i is one or two.

The reference driving signal is a driving signal which is output on the basis of a reference driving signal setting value which is a setting value prepared in advance for light emission control of the light source.

In a case where the medium 3 on which printing is performed is photographed by the camera 50, photographing is performed a plurality of times while changing a position of the carriage section 20 by moving the carriage section 20 in the main scanning direction, and sample photographed data 502 (502a, 502b, . . . ) are created for each photographing. Although the embodiment describes the number of photographing times as "eight", as long as the number of times is equal to or more than two, the number of times may be "four", or may be "ten", and can be appropriately set.

A data format of the sample photographed data 502 is not particularly limited. Any data format may be employed as long as a digital value of a detection value for each photographed pixel (for each pixel) of the image sensor 52 can be distinguishably stored therein.

When the plurality of sample photographed data 502 (502a, 502b, . . . ) can be obtained for the i-th light source, the control section 61 reads luminance values from the sample photographed data 502 (502a, 502b, . . . ), respectively, for each of the pixel, finds an average value, and creates one piece of averaged photographed data 504.

By creating the averaged photographed data 504 from the plurality of sample photographed data 502 (502a, 502b, . . . ), even in a case where a texture of the medium 3 on which printing is performed has fine unevenness, by averaging the luminance values obtained by photographing the unevenness, influence on the calibration can be reduced. If the averaged photographed data 504 are not created, the calibration is optimized to a state of a texture at a position which is unintentionally photographed as a sample. This case has a lower calibration quality than that of the embodiment.

When the averaged photographed data 504 are created, data compression thereof is performed. To be specific, the luminance values of 8 pixels×8 pixels are averaged and replaced with one pixel, and one piece of integrated photographed data 506 is calculated. Note that in the embodiment, although the luminance values of 8×8=64 pixels are integrated, the number M of the integrated pixels (integer of M≥2) can be appropriately changed. For example, the luminance values of 4×4=16 pixels may be integrated, or the luminance values of 12×12=144 pixels may be integrated.

By generating the integrated photographed data 506, even if some of multiple photographed pixels included in the image sensor 52 have malfunctions, the influence on the calibration quality can be reduced by the integration and compression.

When the integrated photographed data 506 are created, representative luminance value calculation processing is performed and a representative luminance value of the i-th light source is calculated. To be specific, in a histogram of the luminance values of all the pixels of the integrated photographed data 506, a predetermined high frequency luminance value which has a higher luminance than the center value and has a lower luminance than the highest luminance value is calculated as the representative luminance value. In the embodiment, luminance order sorted data 508 are created for sorting all the pixels in a luminance order, a luminance value of a pixel of a predetermined number-th from the top (for example, 2000-th may be used, or 2500-th may be used) is set as the representative luminance value. As a matter of course, by creating data of the histogram, the representative luminance value may be calculated.

Next, the control section 61 finds a luminance difference between the representative luminance value of the i-th light source and a target luminance value which satisfies a predetermined target luminance value condition. The target luminance value condition is a condition which may be taken as the luminance value of the pixel of a predetermined number-th from top with respect to ideal integrated photographed data, may be set as one luminance value, or may be set under a condition of values having a certain degree of range. In the latter case, a minimum difference of the values until the representative luminance value satisfies the target luminance value condition becomes the luminance difference.

Subsequently, when the luminance difference is found, by referring to a predetermined adjustment magnification calculation function 636, an adjustment magnification 6 to eliminate this luminance difference is found. The adjustment magnification calculation function 636 may be defined as a directly proportional function with respect to the luminance difference, or can also be defined as a quadratic function. Then, by performing an adjustment by multiplying a reference driving signal setting value 634 for obtaining the reference driving signal by the adjustment magnification 6, a setting value for obtaining a temporary driving signal of the i-th light source, that is, a temporary driving signal setting value 522 is temporarily determined.

As described above, such processing from obtaining the sample photographed data 502 (502a, 502b, . . . ) to determining the temporary driving signal setting value 522 is individually executed for each of the light sources. In the embodiment, since two light sources are included, two temporary driving signal setting values 522 are respectively obtained for the light sources.

When the temporary driving signal setting value 522 can be obtained for each of the light sources, as illustrated in FIG. 6, the control section 61 performs photographing of the medium 3 on which printing is performed under a photographing condition in which all the light sources are lit with the temporary driving signals based on the temporary driving signal setting values 522, respectively, and obtains sample photographed data 542 (542a, 542b, . . . ).

Next, from the sample photographed data 542 (542a, 542b, . . . ), in the same manner as described above, averaged photographed data 544 and integrated photographed data 546 are created, and a representative luminance value from luminance order sorted data 548 is found. Then, from a luminance difference between the representative luminance value and the target luminance value, an adjustment magnification 6AL is found.

The adjustment magnification 6AL obtained under the photographing condition of all the light sources being lit is commonly applied to all the light sources. By the temporary driving signal setting value 522 of each of the light sources being adjusted with the adjustment magnification 6AL, the control section 61 calculates an image quality inspection time driving signal setting value 552 by which a final image quality inspection time driving signal of each of the light sources is obtained. In the embodiment, since the two light sources of the first light source 41 and the second light source 42 are included, two image quality inspection time driving signal setting values 552 are calculated.

A light quantity adjustment of each of the light sources, that is, a light source adjustment of the embodiment is performed as described above. Thereafter, in the calibration, the first light source 41 and the second light source 42 are each lit with the image quality inspection time driving signal to which the image quality inspection time driving signal setting value 552 of each of the light sources is applied.

Figure 7:
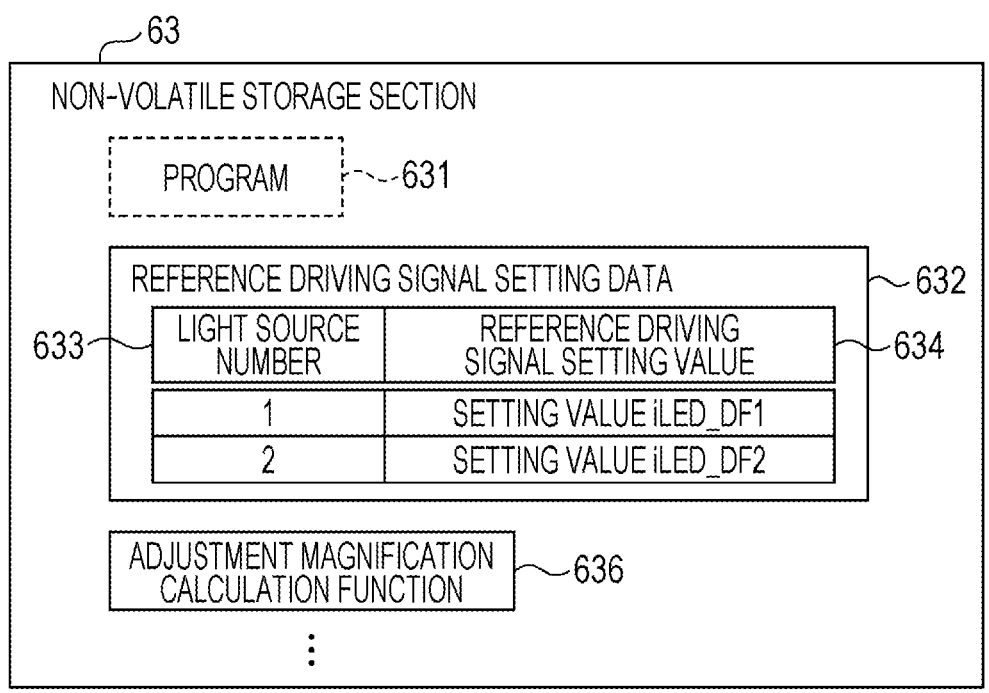
FIG. 7 is a diagram illustrating an example of information stored in a non-volatile storage section.

FIG. 7 is a diagram illustrating an example of information stored in the non-volatile storage section 63.

The non-volatile storage section 63 stores reference driving signal setting data 632 and the adjustment magnification calculation function 636. The reference driving signal setting data 632 store the reference driving signal setting value 634 in association with a light source number 633. As a matter of course, the non-volatile storage section 63 may appropriately store programs and data other than the information described above. For example, in a case where the control section 61 is operated using the CPU instead of the FPGA, a program 631 which makes it possible to execute the above-described setting processing is stored.

Figure 8:
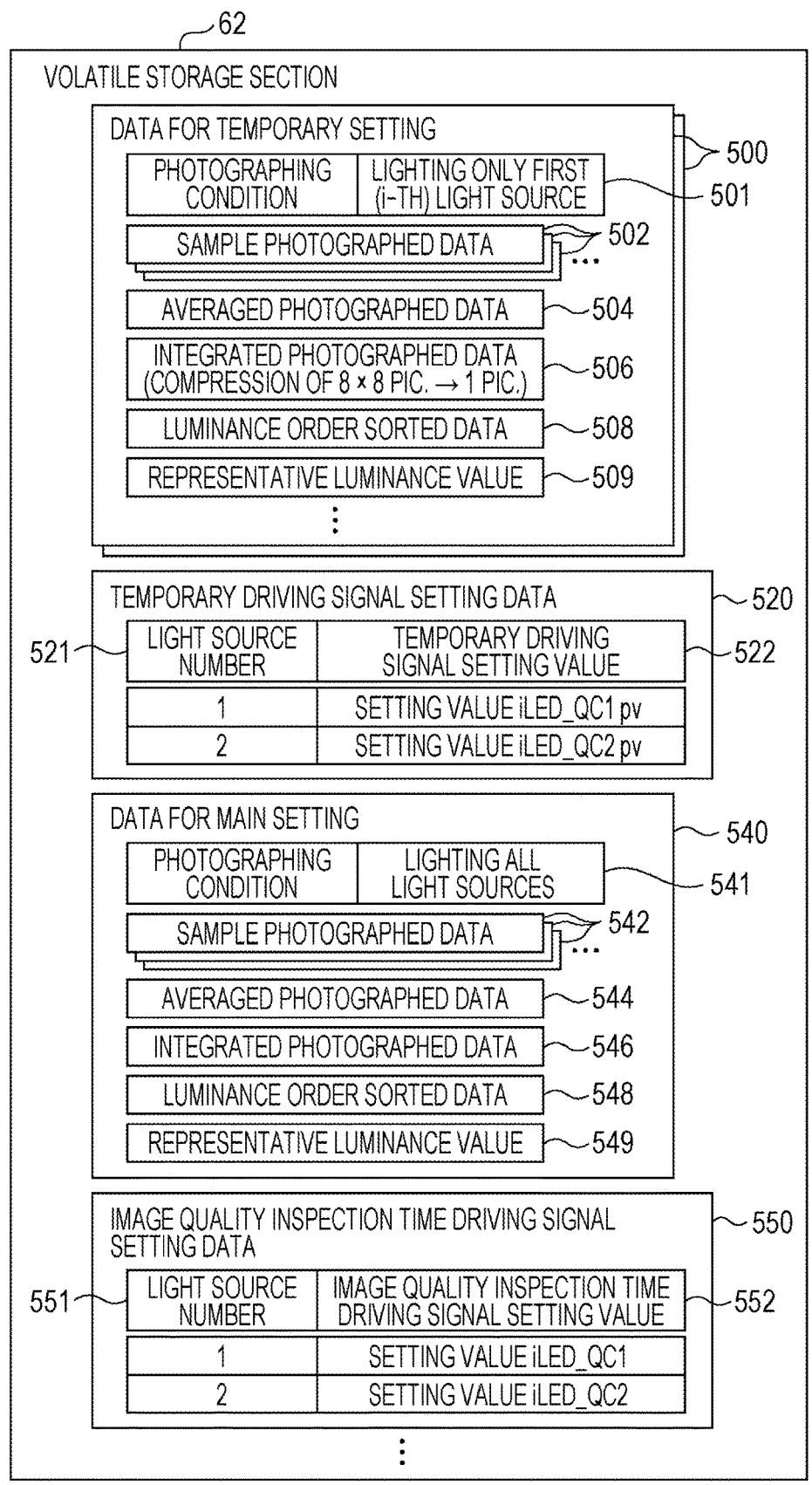
FIG. 8 is a diagram illustrating an example of information stored in a volatile storage section.

FIG. 8 is a diagram illustrating an example of information stored in the volatile storage section 62.

The volatile storage section 62 stores data 500 for temporary setting, temporary driving signal setting data 520, data 540 for main setting, and image quality inspection time driving signal setting data 550. As a matter of course, information other than the information described above can also be appropriately included.

The data 500 for temporary setting are individually prepared for each of the light sources lit by the temporary setting. In other words, the data are prepared for every i-th light source, and various types of data necessary for setting of the temporary driving signal setting value 522 are stored. To be specific, the data 500 for temporary setting include a photographing condition 501, the sample photographed data 502, the averaged photographed data 504, the integrated photographed data 506, the luminance order sorted data 508, and a representative luminance value 509.

The temporary driving signal setting data 520 store the temporary driving signal setting value 522 in association with a light source number 521.

The data 540 for main setting store various types of data necessary for setting a setting value of the image quality inspection time driving signal. For example, included are a photographing condition 541, the sample photographed data 542, the averaged photographed data 544, the integrated photographed data 546, the luminance order sorted data 548, and a representative luminance value 549.

The image quality inspection time driving signal setting data 550 store the image quality inspection time driving signal setting value 552 in association with a light source number 551.

Figure 9:
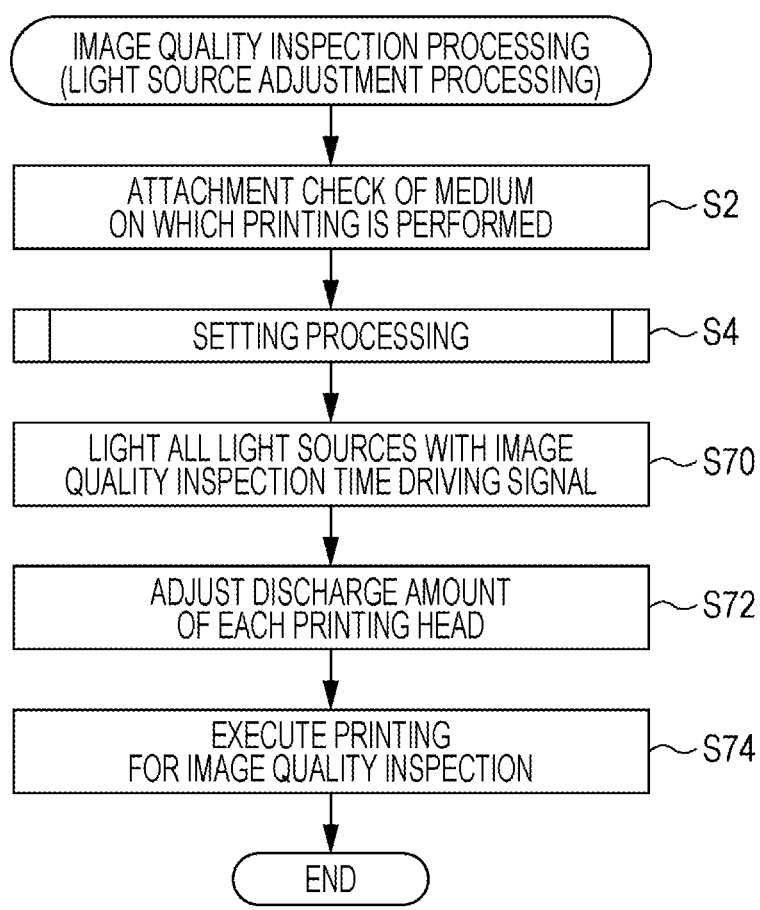
FIG. 9 is a flowchart for explaining a flow of image quality inspection processing in the printing apparatus.

FIG. 9 is a flowchart for explaining a flow of a light source adjustment method which is image quality inspection processing of the printing apparatus 10. The printing apparatus 10 confirms that the medium 3 on which printing is performed is attached (step S2), and transmits a predetermined setting processing execution signal to the control section 61 to causes the control section 61 to execute the setting processing.

Figure 10:
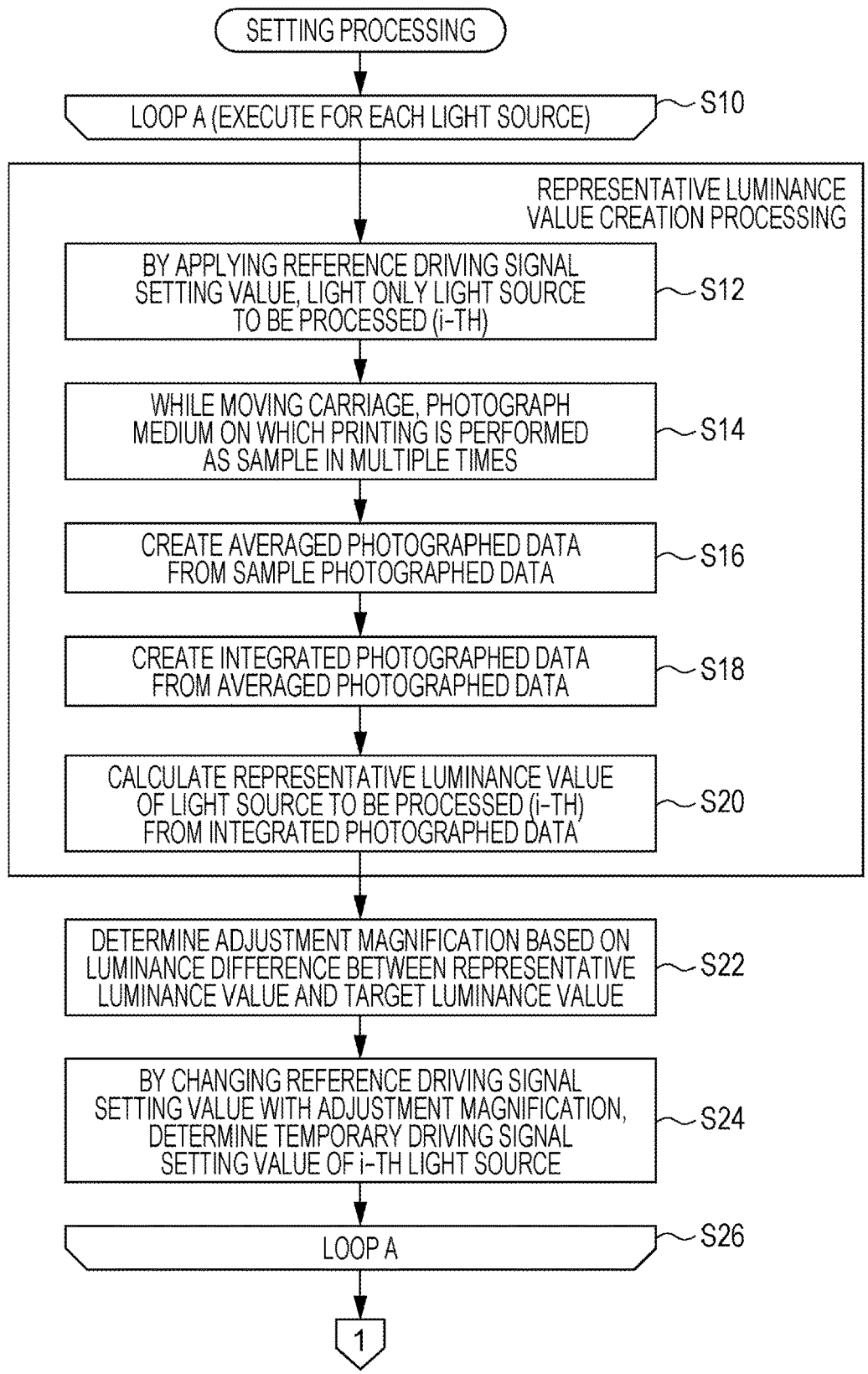
FIG. 10 is a flowchart for explaining a flow of processing in the setting processing.
Figure 11:
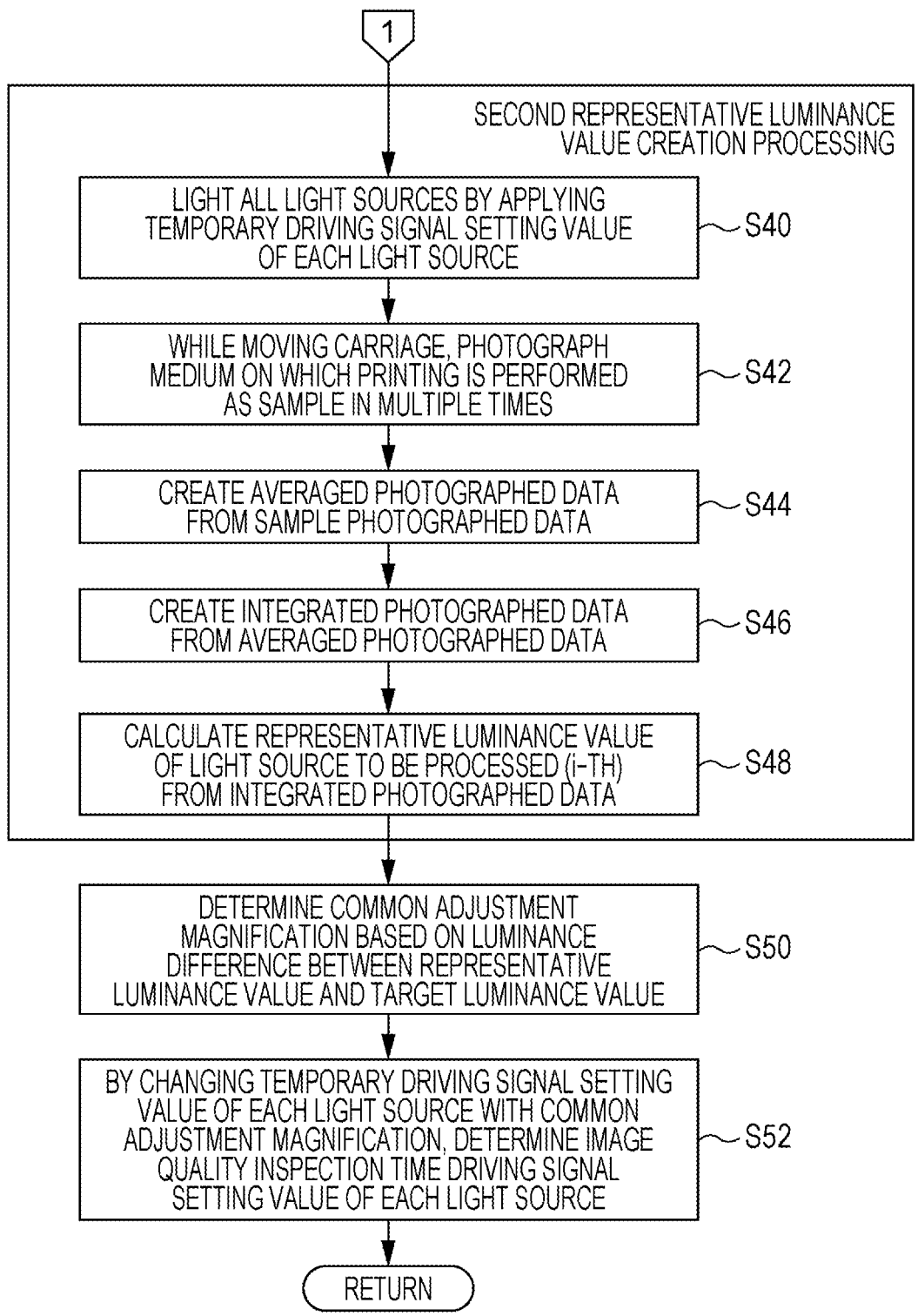
FIG. 11 is a flowchart continued from FIG. 10.

FIG. 10 and FIG. 11 are flowcharts for explaining a flow of the setting processing.

As illustrated in FIG. 10, in the setting processing, the control section 61 first executes a loop A for each of the light sources (step S10 to step S26).

To be specific, in the loop A, the control section 61 creates the data 500 for temporary setting of the light source to be processed, reads the reference driving signal setting value 634, and lights the light source with the reference driving signal (step S12).

Next, the control section 61, while causing the carriage section controller 22 to appropriately move the carriage in the main scanning direction, performs photographing of the medium 3 on which printing is performed a plurality of times, and generates and stores the sample photographed data 502 (step S14).

Next, the control section 61 creates the averaged photographed data 504 on the basis of the sample photographed data 502 of the light source to be processed (step S16), and creates the integrated photographed data 506 from the averaged photographed data 504 (step S18). Then, the representative luminance value 509 for the light source to be processed is calculated from the integrated photographed data 506 (step S20).

Next, the luminance difference between the representative luminance value 509 and the target luminance value is found, and the adjustment magnification 6 (see FIG. 5) is determined with reference to the adjustment magnification calculation function 636 (step S22), and multiplying the reference driving signal setting value 634 of the light source to be processed by the adjustment magnification, the temporary driving signal setting value 522 of the light source is determined (step S24). Then, the loop A ends (step S26).

When the loop A is executed for all the light sources, changing to FIG. 11, the control section 61 creates the data 540 for main setting, and each of the light sources is lit with the temporary driving signal based on the temporary driving signal setting value 522 of each of the light sources (step S40).

Next, while appropriately requesting the carriage section controller 22 to control movement of the carriage in the main scanning direction, the medium 3 on which printing is performed is photographed a plurality of times, and the sample photographed data 542 are generated and stored (step S42).

Next, the control section 61 creates the averaged photographed data 544 on the basis of the sample photographed data 542 (step S44), and creates the integrated photographed data 546 from the averaged photographed data 544 (step S46). Then, the representative luminance value 549, in a case where all the light sources are lit, is calculated from the integrated photographed data 546 (step S48).

Next, the luminance difference between the representative luminance value 549 and the target luminance value is found, and the common adjustment magnification 6AL (see FIG. 6) is determined with reference to the adjustment magnification calculation function 636 (step S50), and multiplying the temporary driving signal setting value 522 of each of the light sources by the common adjustment magnification 6AL, the image quality inspection time driving signal setting value 552 of each of the light sources is determined (step S52), and the setting processing ends.

Returning to FIG. 9, the printing machine control board 12 causes the control section 61 to light all the light sources with the image quality inspection time driving signals, respectively, to which the image quality inspection time driving signal setting values 552 are respectively applied (step S70), adjusts a discharge amount of each of the printing heads (step S72), and executes printing for image quality inspection (step S74).

As described above, according to the embodiment, the light quantity of each of the light sources can be adjusted to the light quantity suitable for the calibration, and thus the favorable calibration using the plurality of light sources and the camera can be achieved.

Modification

Note that an embodiment to which the invention can be applied is not limited to the above-described embodiment, and it is needless to say that the invention can be appropriately changed in a range without departing from the scope of the invention.

First Modification

For example, in the above-described embodiment, a configuration can also be employed in which steps S40 to S52 are omitted, and the temporary driving signal setting value 522 being determined at step S24 is used as determining the image quality inspection time driving signal setting value 552. The configuration is such that the processing described with reference to FIG. 6 is omitted, the temporary driving signal setting value 522 being determined in the processing described with reference to FIG. 5 is used as determining the image quality inspection time driving signal setting value 552.

Second Modification

Additionally, for example, although the above-described embodiment describes that the photographed data is derived in an order of the sample photographed data 502→the averaged photographed data 504→the integrated photographed data 506, and the representative luminance value 509 is calculated from the integrated photographed data 506, the order of the averaging and integrating can also be reversed.

Figure 12:
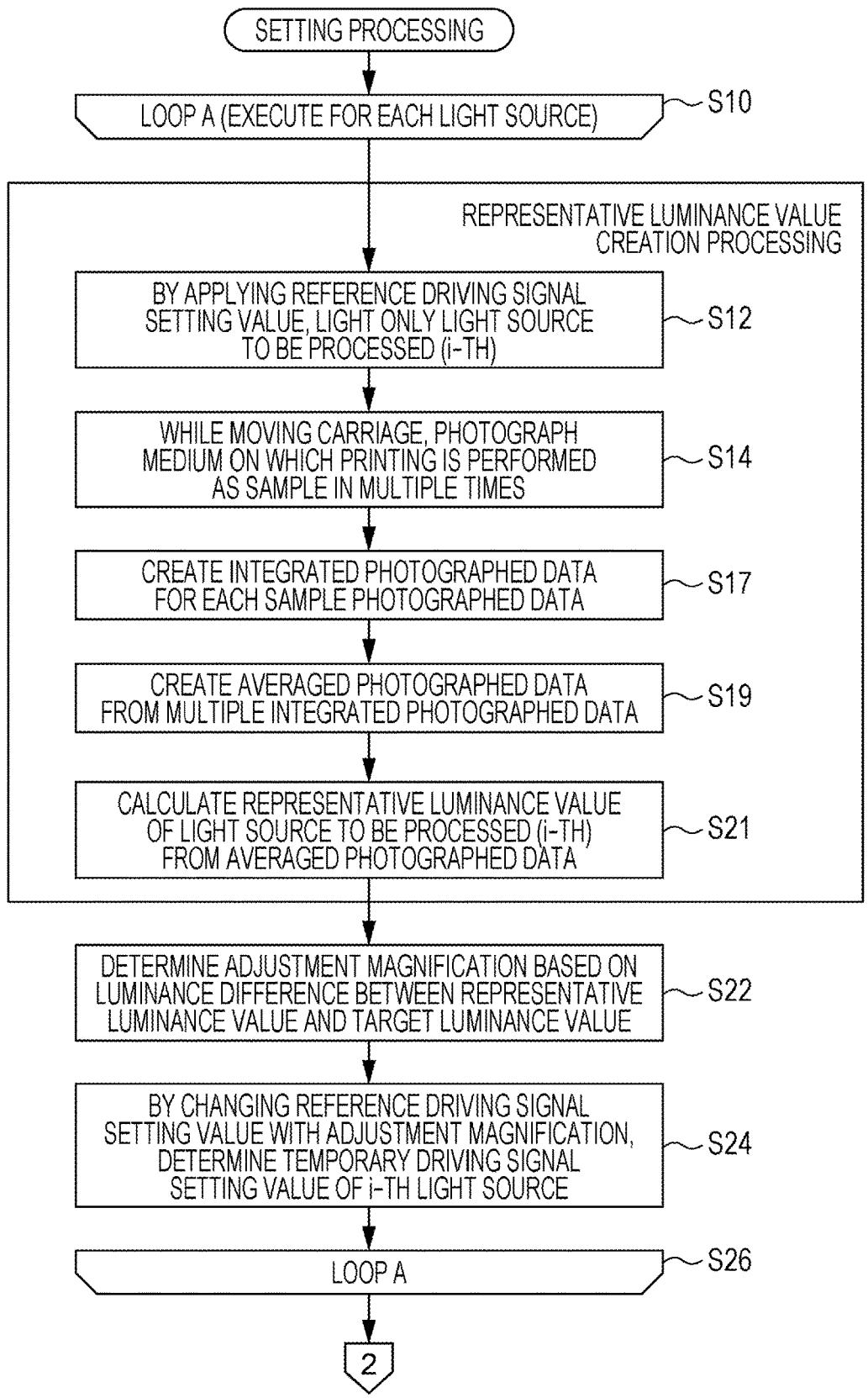
FIG. 12 is a flowchart for explaining a flow of processing of setting processing in a modification.

To be specific, for example, as illustrated in FIG. 12, instead of step S16 in the above-described embodiment, by performing the data compression for each of the sample photographed data 502 (502a, 502b, . . . ), step S17 for creating each of the integrated photographed data 506 (506a, 506b, . . . ) is executed. Next, instead of step S18 in the above-described embodiment, by performing averaging for each of the pixels from the plurality of integrated photographed data 506 (506a, 506b, . . . ), step S19 for creating one piece of averaged photographed data 504 is executed. Then, instead of step S20 in the above-described embodiment, by creating the luminance order sorted data 508 of the pixel of the averaged photographed data 504, step S21 for determining the representative luminance value 509 may be executed.

Figure 13:
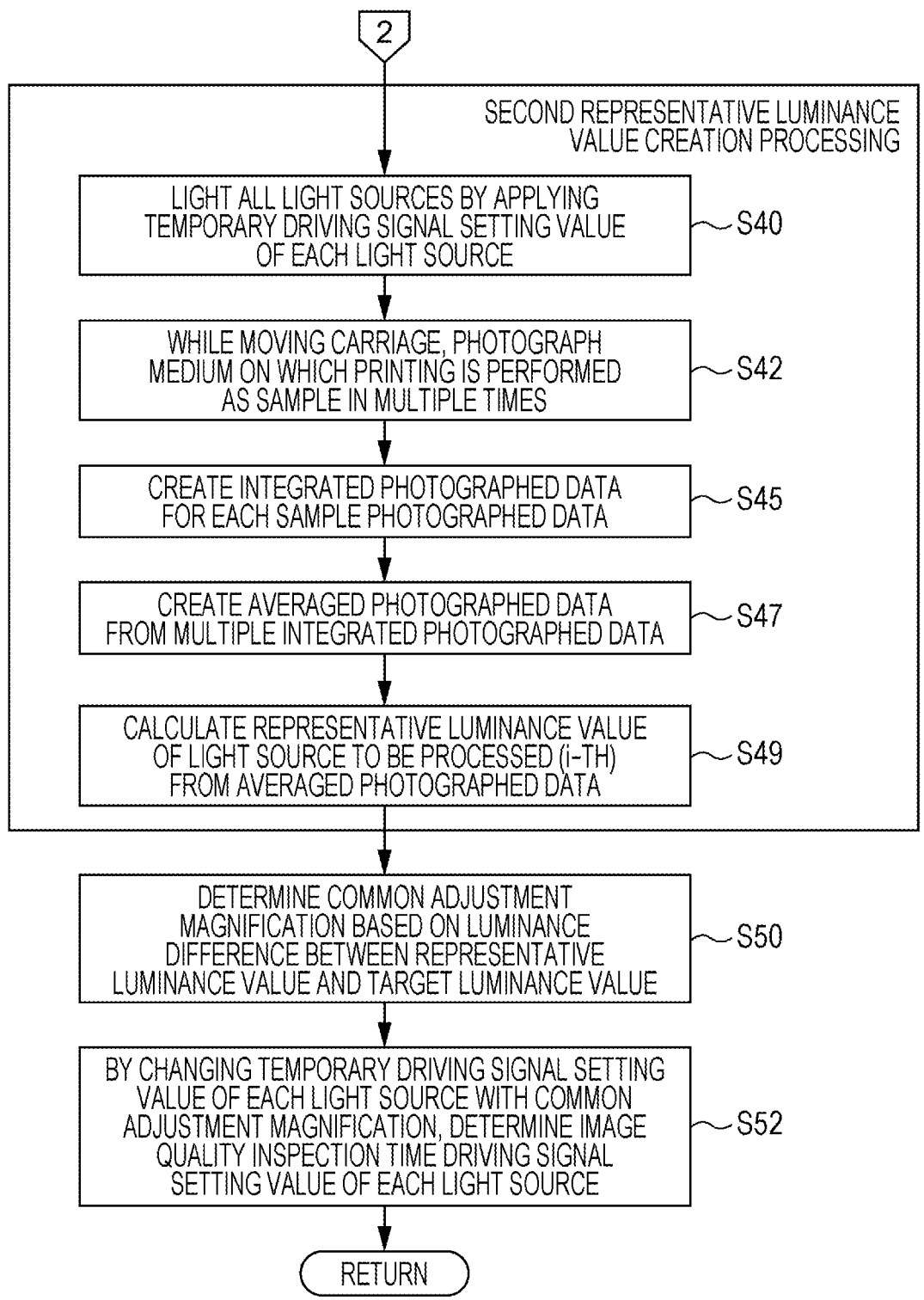
FIG. 13 is a flowchart continued from FIG. 12.

In the same manner, as illustrated in FIG. 13, instead of step S44 in the above-described embodiment, by performing the data compression for each of the sample photographed data 542 (542a, 542b, . . . ), step S45 for creating each of the integrated photographed data 546 (546a, 546b, . . . ) is executed. Next, instead of step S46 in the above-described embodiment, by averaging for each of the pixels from the plurality of integrated photographed data 546 (546a, 546b, . . . ), step S47 for creating one piece of averaged photographed data 544 is executed. Then, instead of step S48 in the above-described embodiment, by creating the luminance order sorted data 548 of the pixel of the averaged photographed data 544, step S49 for determining the representative luminance value 549 may be executed.

Third Modification

Additionally, in the above-described embodiment, although the number of the light sources is two, three or more light sources can also be included.

Figure 14:
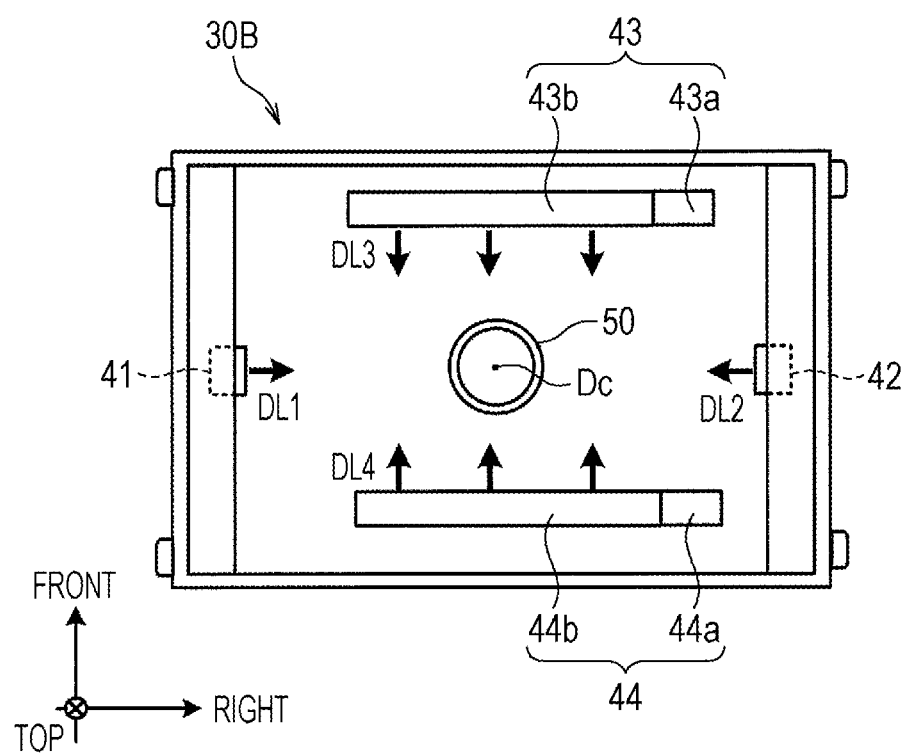
FIG. 14 is a diagram illustrating an image quality inspection camera system in the modification.

FIG. 14 is a schematic diagram illustrating an example of an arrangement positional relationship of light sources of an image quality inspection camera system according to a modification, and corresponds to a bottom view when viewed from the opening portion side of the case 31. The diagram corresponds to a bottom view when viewed from a lower side of FIG. 3. In the configuration, in the same manner as the above-described embodiment, in addition to the first light source 41 and the second light source 42, a third light source 43 and a fourth light source 44 are included. Additionally, these four light sources are arranged such that light emission front directions DL1 to DL4 thereof surround the optical axis Dc of the camera 50 from four sides, respectively.

Note that in the example in FIG. 14, although a configuration in which the third light source 43 and the fourth light source 44 function as line shaped light sources or surface shaped light sources by light from LEDs 43a and 44a being guided by light guide materials 43b and 44b, respectively, is illustrated, point light sources may be used in the same manner as the first light source 41 and the second light source 42.

This application claims priority to Japanese Application No. 2018-024222, filed 14 Feb. 2018, the entirety of which is incorporated by reference herein

What is claimed is:

1. An image quality inspection camera system comprising:
N (N≥2) light sources that emit light on a medium on which printing is performed;
a camera for photographing the medium; and
a control section,
wherein the control section executes setting processing, based on photographed data photographed by the camera when an i-th light source (i=1 to N) is lit with a reference driving signal, for setting an image quality inspection time driving signal of the i-th light source, and
the setting processing includes
calculating an i-th representative luminance value by performing a predetermined representative luminance value calculation processing based on a luminance value of each pixel photographed by the camera when the i-th light source is lit with the reference driving signal, and
determining the image quality inspection time driving signal of the i-th light source by adjusting the reference driving signal such that the i-th representative luminance value satisfies a predetermined target luminance value condition.

2. An image quality inspection camera system comprising:
N (N≥2) light sources that emit light on a medium on which printing is performed;
a camera for photographing the medium; and
a control section,
wherein the control section executes setting processing, based on photographed data photographed by the camera when an i-th light source (i=1 to N) is lit with a reference driving signal, for setting an image quality inspection time driving signal of the i-th light source, and
the setting processing includes
calculating an i-th representative luminance value by performing a predetermined representative luminance value calculation processing based on a luminance value of each pixel photographed by the camera when the i-th light source is lit with the reference driving signal,
temporarily determining a temporary driving signal of the i-th light source by adjusting the reference driving signal such that the i-th representative luminance value satisfies a predetermined target luminance value condition, and
determining, based on the luminance value of each pixel photographed by the camera when N light sources are lit by lighting the i-th light source with the temporary driving signal which corresponds to the i-th light source, the image quality inspection time driving signal of the i-th light source by adjusting the temporary driving signal of each light source.

3. The image quality inspection camera system according to claim 1,
wherein the representative luminance value calculation processing includes
calculating integrated photographed data by integrating luminance values of respective M (M≥2) pixels photographed by the camera when the i-th light source is lit with the reference driving signal, and
calculating the i-th representative luminance value based on the integrated photographed data.

4. The image quality inspection camera system according to claim 1,
wherein the image quality inspection camera system is provided in a carriage section of a printing apparatus, and
the representative luminance value calculation processing includes
calculating, during movement of the carriage section in a main scanning direction, for photographed data of a plurality of times photographed by the camera when the i-th light source is lit with the reference driving signal, averaged photographed data by averaging luminance values of corresponding pixels, and
calculating the i-th representative luminance value based on the averaged photographed data.

5. The image quality inspection camera system according to claim 1,
wherein the image quality inspection camera system is provided in a carriage section of a printing apparatus, and
the representative luminance value calculation processing includes
calculating, during movement of the carriage section in a main scanning direction, for photographed data of a plurality of times photographed by the camera when the i-th light source is lit with the reference driving signal, photographed data by averaging luminance values of corresponding pixels and integrating luminance values of respective M (M≥2) pixels, and
calculating the i-th representative luminance value based on the photographed data on which the averaging and the integrating are performed.

6. The image quality inspection camera system according to claim 1,
wherein calculating the i-th representative luminance value is calculating a predetermined high frequency luminance value to be a higher luminance than a center value and a lower luminance than a highest luminance value of a histogram of luminance values of the respective pixels included in the photographed data as a representative luminance value.

7. The image quality inspection camera system according to claim 1,
wherein the control section performs the light quantity setting processing for the medium in a state before printing for image quality inspection.

8. The image quality inspection camera system according to claim 1,
wherein the N light sources include at least two light sources,
the two light sources are installed at positions where light emission front directions are directions of a regular reflection to each other with respect to the medium, and the camera is installed such that an optical axis of the camera faces a reflection position of the regular reflection.

9. The image quality inspection camera system according to claim 1,
wherein the control section performs the image quality inspection processing while lighting all the N light sources, by driving the i-th light source with the image quality inspection time driving signal set through the setting processing.

10. A printing apparatus comprising:
the image quality inspection camera system according to claim 1.

11. A printing apparatus comprising:
the image quality inspection camera system according to claim 2.

12. A printing apparatus comprising:
the image quality inspection camera system according to claim 3.

13. A printing apparatus comprising:
the image quality inspection camera system according to claim 4.

14. A printing apparatus comprising:
the image quality inspection camera system according to claim 5.

15. A printing apparatus comprising:
the image quality inspection camera system according to claim 6.

16. A printing apparatus comprising:
the image quality inspection camera system according to claim 7.

17. A printing apparatus comprising:
the image quality inspection camera system according to claim 8.

18. A printing apparatus comprising:
the image quality inspection camera system according to claim 9.

19. A light source adjustment method in an image quality inspection camera system installed in a printing apparatus,
the image quality inspection camera system including
N (N≥2) light sources that emit light on a medium on which printing is performed, and
a camera for photographing the medium,
the light source adjustment method comprising:
lighting an i-th light source (i=1 to N) with a reference driving signal;
setting, based on photographed data photographed by the camera when the i-th light source is lit, an image quality inspection time driving signal of the i-th light source;
calculating an i-th representative luminance value by performing a predetermined representative luminance value calculation processing based on a luminance value of each pixel photographed by the camera when the i-th light source is lit with the reference driving signal; and
determining the image quality inspection time driving signal of the i-th light source by adjusting the reference driving signal such that the i-th representative luminance value satisfies a predetermined target luminance value condition.

* * * * *